July 24, 1923.
F. T. HUNTINGTON
POULTRY FEED BOX
Filed Dec. 4, 1919
1,462,751
2 Sheets-Sheet 2
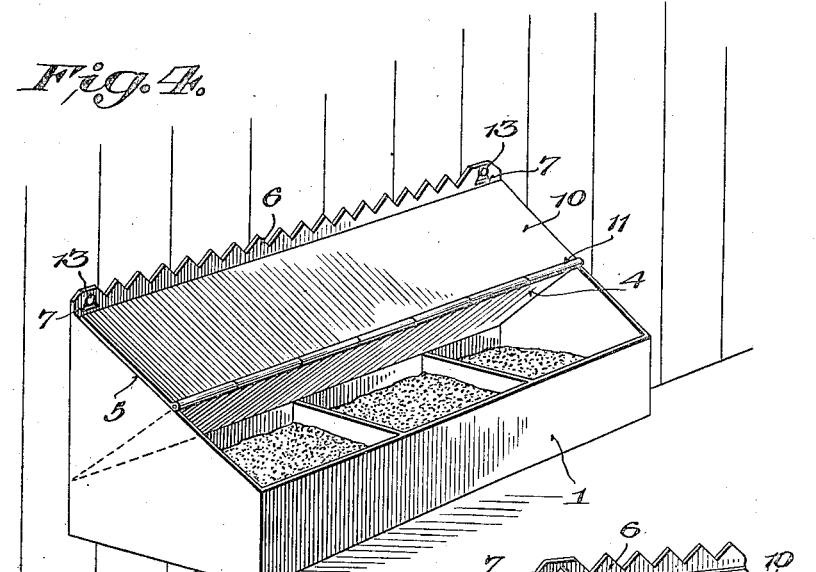
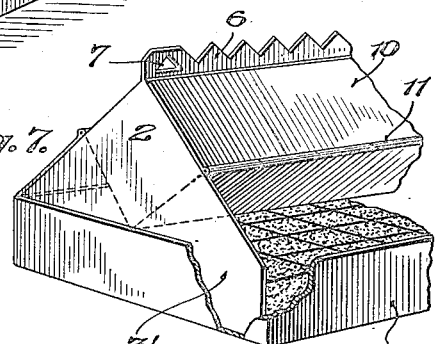
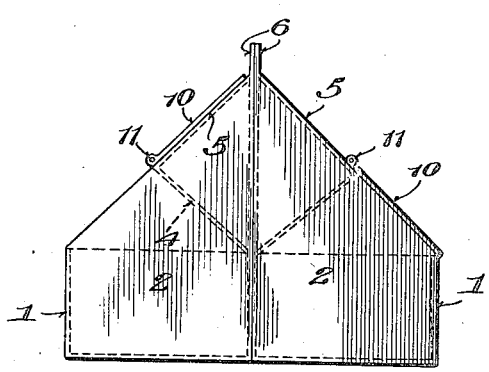
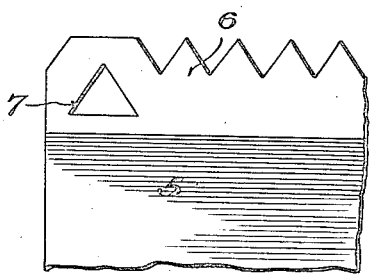
Inventor
F. T. Huntington,
Witness Patented July 24, 1923.

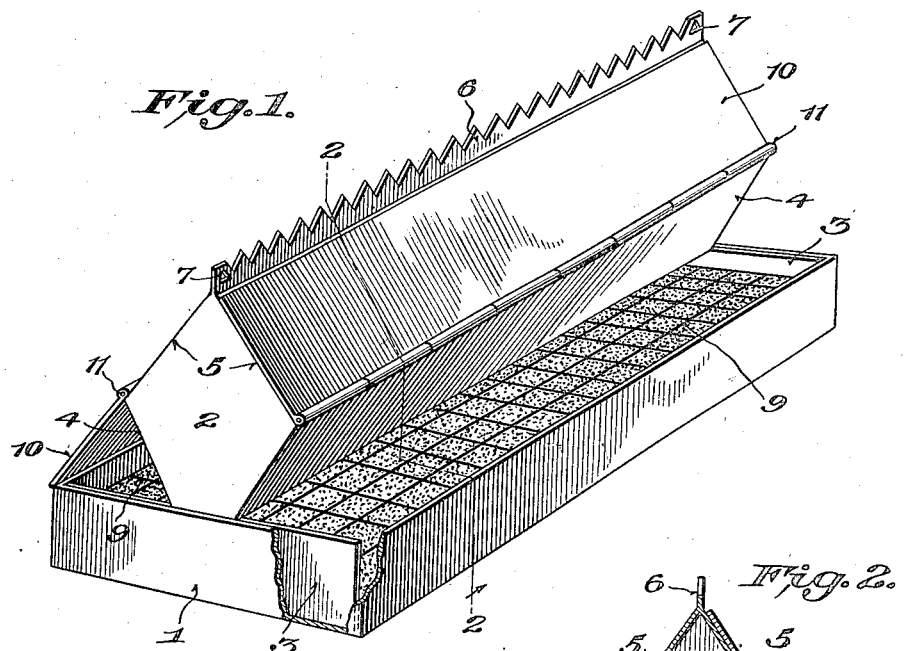
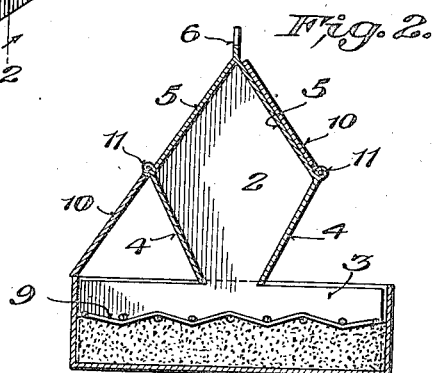
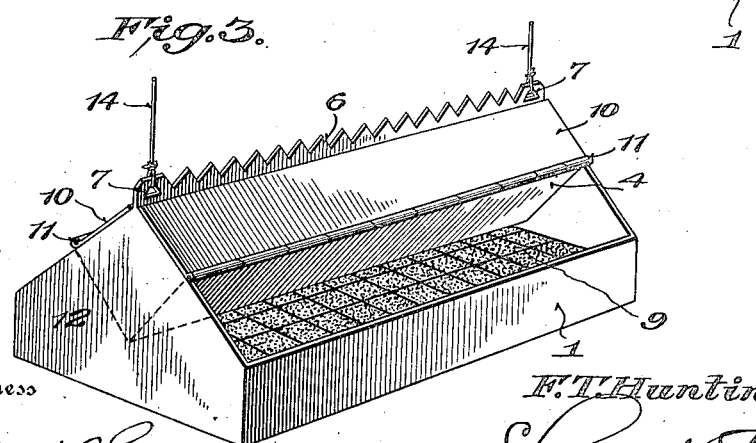

1,462,751

UNITED STATES PATENT OFFICE.

FREDERICK T. HUNTINGTON, OF NORTH BENNINGTON, VERMONT.

POULTRY FEED BOX.

Application filed December 4, 1919. Serial No. 342,425.

*To all whom it may concern:*

Be it known that I, FREDERICK T. HUNTINGTON, a citizen of the United States, residing at North Bennington, in the county of Bennington and State of Vermont, have invented new and useful Improvements in Poultry Feed Boxes, of which the following is a specification.

This invention relates to poultry feed boxes, and has for its object to provide certain new and useful improvements as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings:

Figure 1 is a perspective view of the present invention.

Figure 2 is a cross sectional view on the line 2—2 of Figure 1.

Figure 3 is a perspective view illustrating a modification.

Figure 4 is a perspective view illustrating the device adapted to be secured to a wall.

Figure 5 is an end view showing two of the feed boxes, as embodied in Figure 4 placed back to back constituting a double feed box.

Figure 6 is a detailed fragmentary elevation.

Figure 7 is a fragmentary perspective view illustrating another modification.

At first referring more particularly to Figures 1 and 2 of the drawings, it will be seen that the present invention includes a feed container 1, preferably in the form of a rectangular box open at its top. Disposed centrally above the open top of the box and extending longitudinally thereof is a guard member 2 dividing the box into opposite half sections. At each end of the guard there is a cross head 3 which fits within the box, lies against the inner face of the adjacent side of the box and rests upon the bottom of the box, whereby the guard is detachably supported in position in a very simple and efficient manner. Each wall portion 4 of the guard 2 is inclined upwardly and outwardly at a suitable angle so as to overhang the open top of the box for a purpose as will be hereinafter described.

The other duplicate walls 5 of the guard converge upwardly and meet at the top of the guard. The top of the guard is provided with a plurality of upstanding projections, preferably in the form of upstanding teeth provided upon a bar or plate 6 suitably secured to the top of the gaurd and extending throughout the length thereof. In each end of the bar or plate 6 there is a triangular opening 7 having its apex at the top.

In the embodiment of the invention as thus far described, it will be understood that the feed is placed in the box through the open top thereof and at each side of the guard 2, after which the birds may have access to the feed through the open top of the box and at opposite sides of the guard. It will be noted that each guard wall 4 overhangs the open top of the box, and leaves a side opening through which the birds may thrust their heads and have access to the feed. By overhanging the open top of the box, the guard 4 reduces the space immediately above the open top of the box and thereby prevents the birds from standing in the box.

Each guard wall 5 is inclined at such an angle that the birds cannot stand thereon, and by reason of the teeth or projections upon the top of the guard the birds will not roost or stand thereon, and thereby the present invention produces a sanitary device which will never become fouled by droppings from the birds.

If desired, a foraminous screen 9 may be placed upon the top of the feed so as to prevent scattering and loss thereof when the birds are feeding, the openings in the screen permitting ready access to the feed which is below the screen. The screen is loose and may be readily applied or removed through the open top of the box at either side of the gaurd.

The box may be supplied with feed through the open top thereof at either or both sides of the guard 2. For convenience in cleaning the box, the guard 2 may be lifted out of the box. It will of course be understood that the guard and its cross heads 3 fit with sufficient snugness within the box to prevent looseness of the parts.

To prevent access to the feed, a closure or cover 10 is provided at each side of the guard 2 and connected to the top of the guard wall 4 by suitable hinges 11, whereby the cover may be swung down into engagement with the top of the box, as shown in Figure 2 and thereby close the space at one side of the guard. The cover or closure may be folded upwardly against the inclined wall 5 of the guard in which position it will remain without the employement of fastening devices, thereby leaving the open top of the box unobstructed.

In the embodiment of the invention shown in Figure 3 of the drawings, each end of the box has an upright triangular extension 12, and the guard 2 is secured to and between said extensions and is not removable, otherwise the device is the same as shown in Figures 1 and 2.

In Figure 4 there has been shown a single device identical with a longitudinal half section of what is shown in Figure 3. This form of device is adapted to be hung upon a wall, in the manner shown in the drawings, by receiving suitable headed fastenings 13 through the openings 7, such fastening projecting from an upright wall as shown in the drawings. Of course this form of the box may also be supported upon the ground or floor of a house. Two such forms of the box are shown placed back to back, in Figure 5 of the drawings, so as to produce a double feed box having the same features and functions as illustrated in Figure 3.

The present feed box may be suspended by cords or wires 14 suitably engaged with the openings 7 as shown in Figure 3 of the drawings.

The modification shown in Figure 7 is similar to the construction shown in Figure 1, except that the cross-head 3' is of the same shape as the end 12 of the box shown in Figure 3, whereby the ends of the feeding spaces are closed instead of being open as in Figure 1. It will of course be understood that the guard member 2 and its cross-heads are removably contained within the box 1.

What I claim is:

1. A poultry feed box, comprising a box body open at its top, a fixed guard above the box body comprising fixed reversely inclined upper and lower walls, the lower wall inclining upwardly and forwardly and the upper wall inclining rearwardly and upwardly, and a cover hinged to the guard at or near the juncture of its walls and adapted when open to fold and rest upon the upper guard wall and when closed to lie approximately in the plane thereof.

2. A feed box for poultry, comprising a box body having an open top, a guard extending centrally across the open top of the box and including lower fixed upwardly diverged sides overhanging the open top of the box and upper upwardly converged sides leading from the tops of the lower sides, and covers for the open top portions of the box at opposite sides of the guard, each cover being hinged to the guard at the juncture of the adjacent top and bottom sides and capable of being folded back upon the adjacent upper side in the open position of the cover, said cover when closed extending downwardly and outwardly from the guard and having its lower edge resting upon the top of the box.

3. A feed box for poultry, comprising a box body having an open top, a removable guard extending centrally across the open top of the box and including opposite cross heads, lower guard members extending between and carried by the cross heads and diverging upwardly and overhanging the open top of the box, upwardly converged guard members leading from the tops of the lower guard members, and covers for the open top portions of the box at opposite sides of the guard, each cover being hinged to the guard at the junction of the adjacent upper and lower guard members and capable of being folded back upon the adjacent upper guard member in the open position of the cover, said cover when closed extending downwardly and outwardly from the guard and having its lower edge resting upon the top of the box.

FREDERICK T. HUNTINGTON.